March 30, 1937.  F. S. RICH  2,075,056
METER
Filed May 7, 1932  6 Sheets-Sheet 1

INVENTOR
F. S. RICH
By Hazard and Miller
ATTORNEYS

March 30, 1937. F. S. RICH 2,075,056
METER
Filed May 7, 1932 6 Sheets-Sheet 2
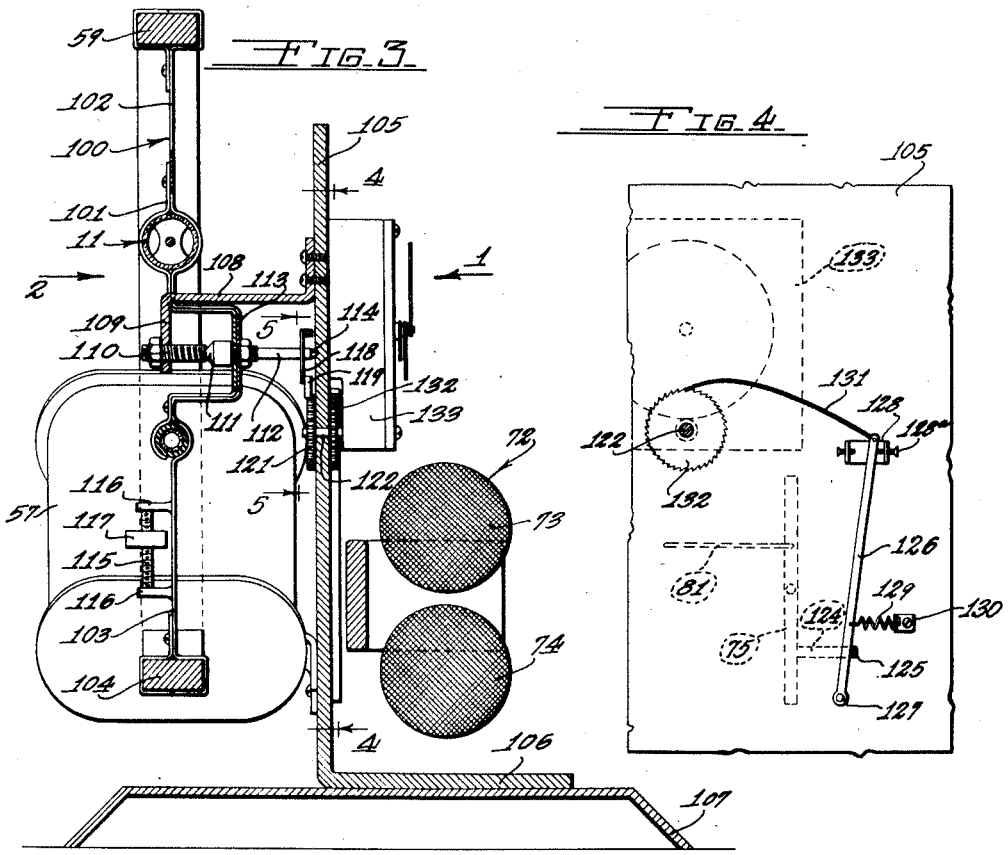
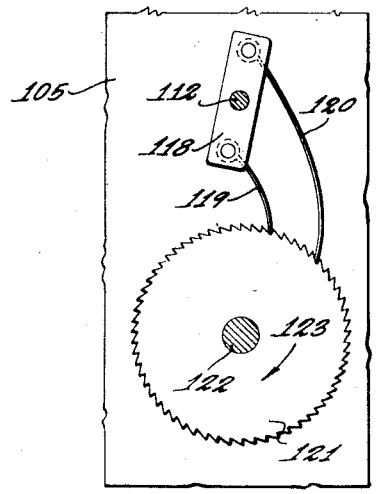
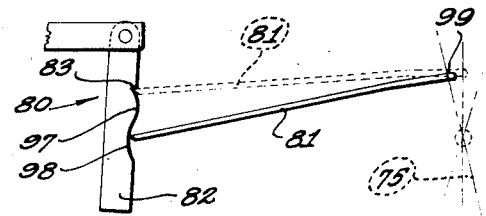
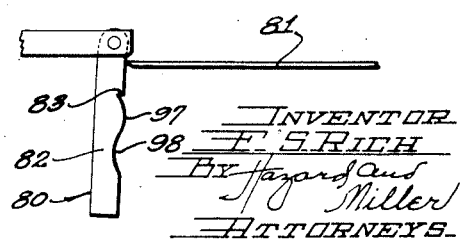

March 30, 1937. F. S. RICH 2,075,056
METER
Filed May 7, 1932 6 Sheets-Sheet 3
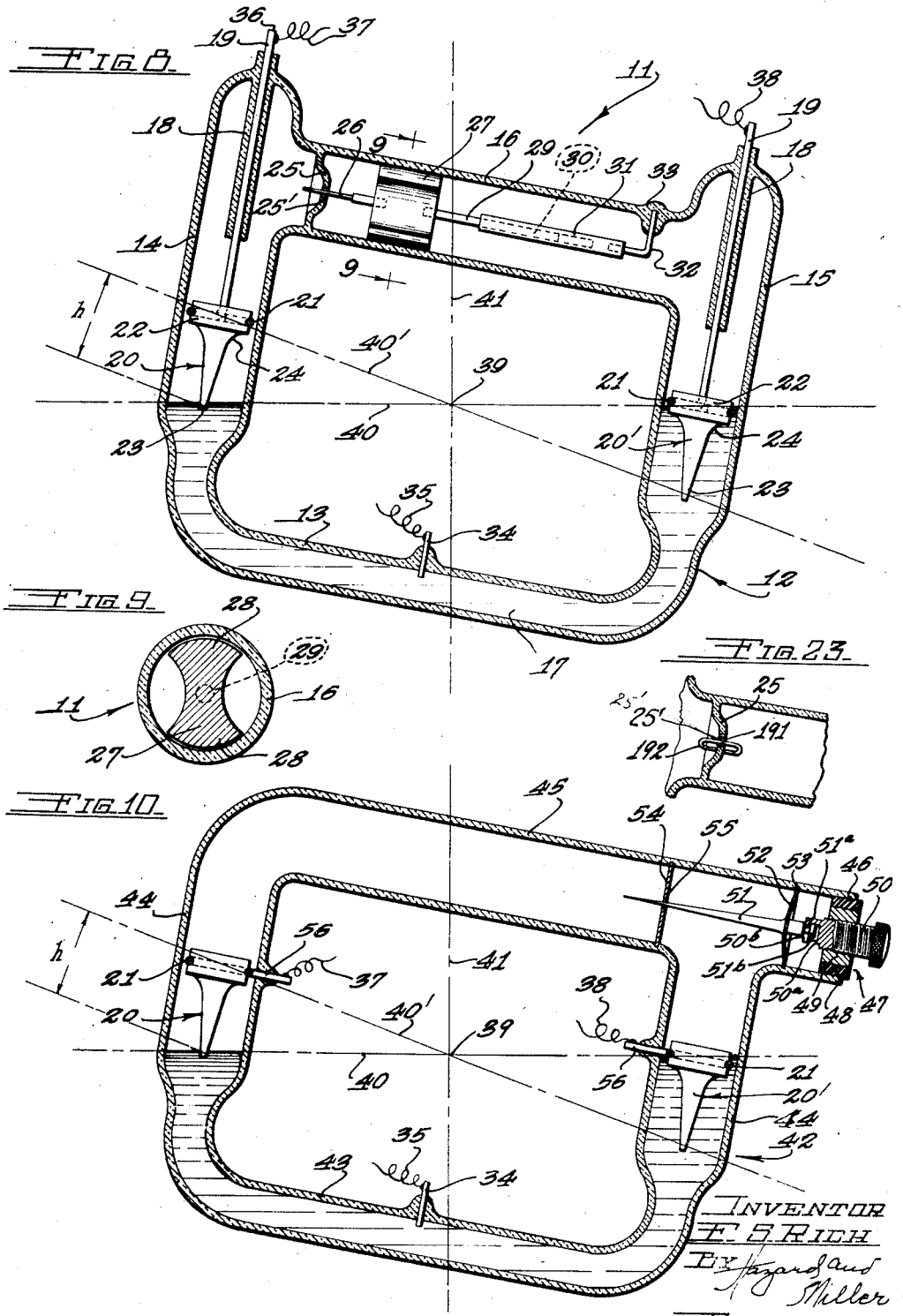

March 30, 1937.　　　　F. S. RICH　　　　2,075,056
METER
Filed May 7, 1932　　　　6 Sheets-Sheet 4
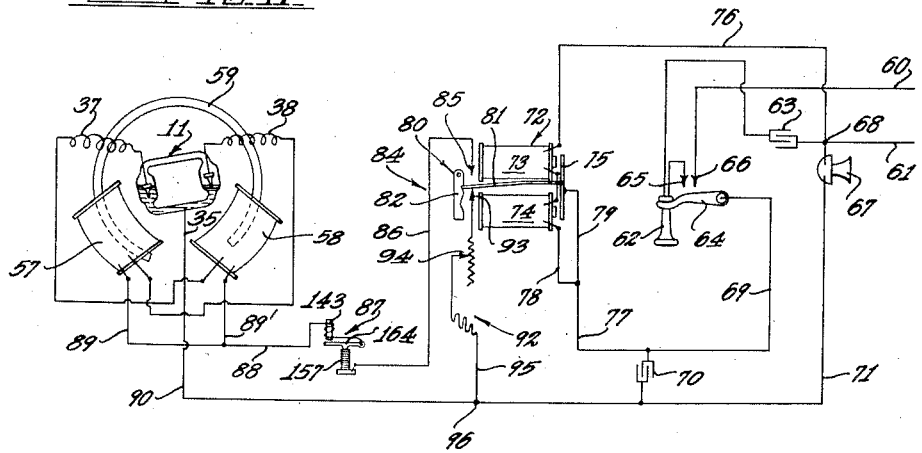
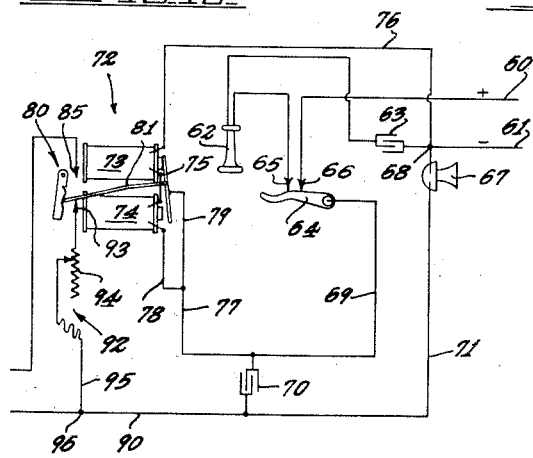
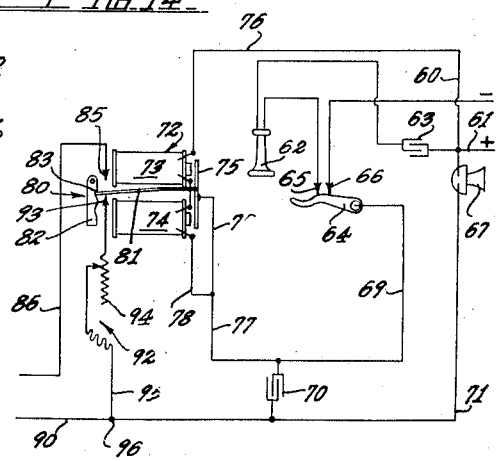
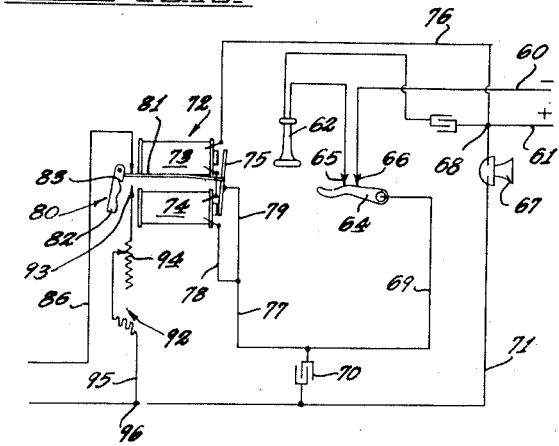
INVENTOR
F. S. RICH
By Hazard and Miller
ATTORNEYS March 30, 1937. F. S. RICH 2,075,056
METER
Filed May 7, 1932 6 Sheets-Sheet 5
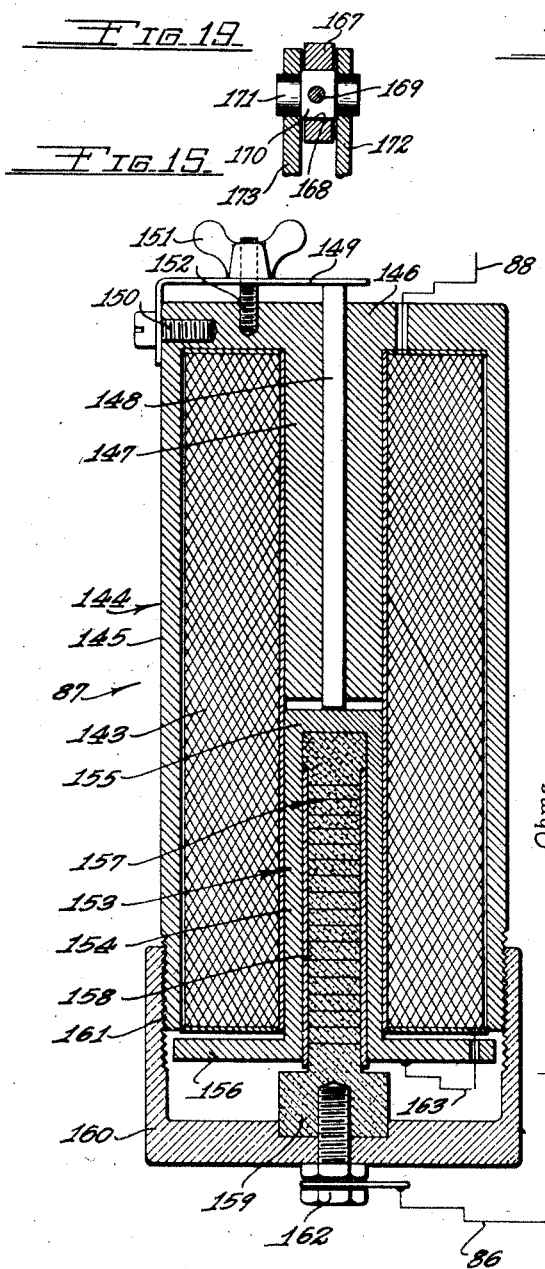
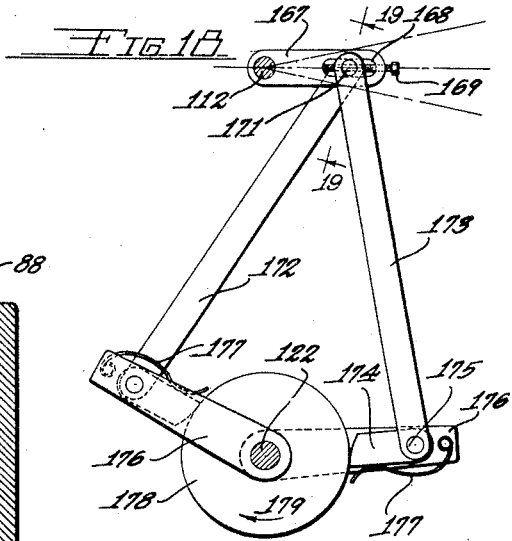
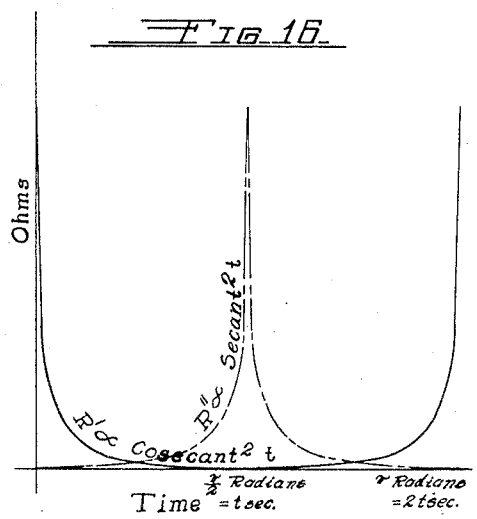
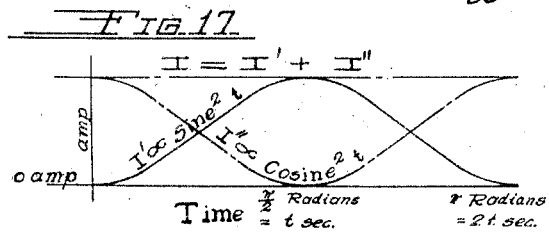

March 30, 1937.  F. S. RICH  2,075,056
METER
Filed May 7, 1932  6 Sheets-Sheet 6
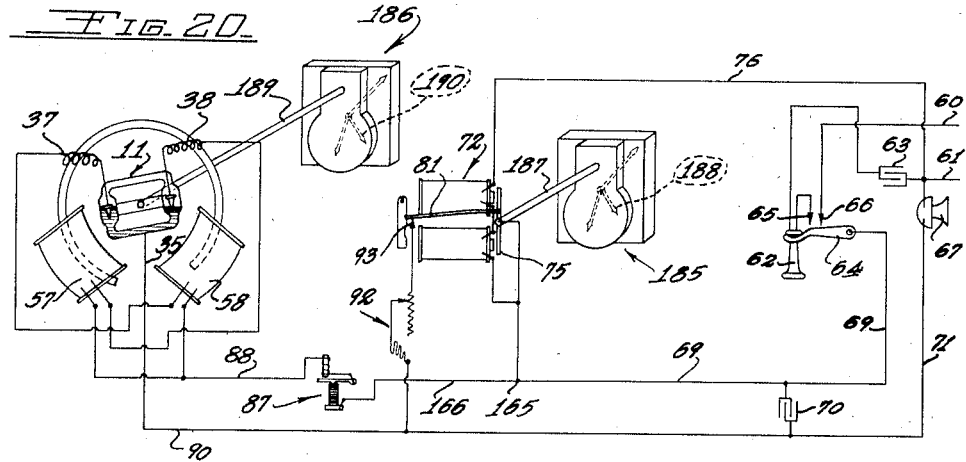
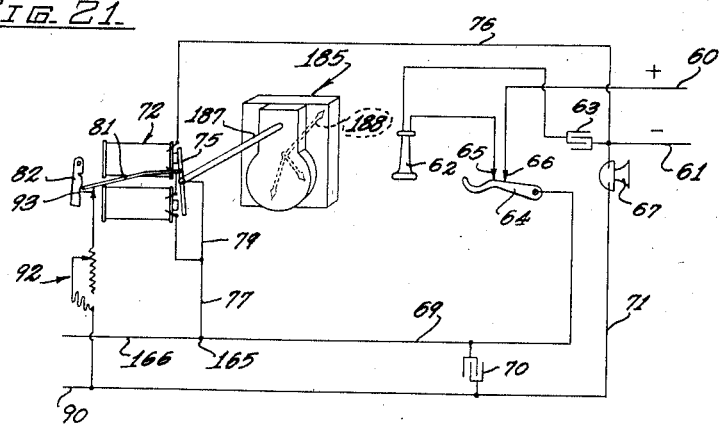
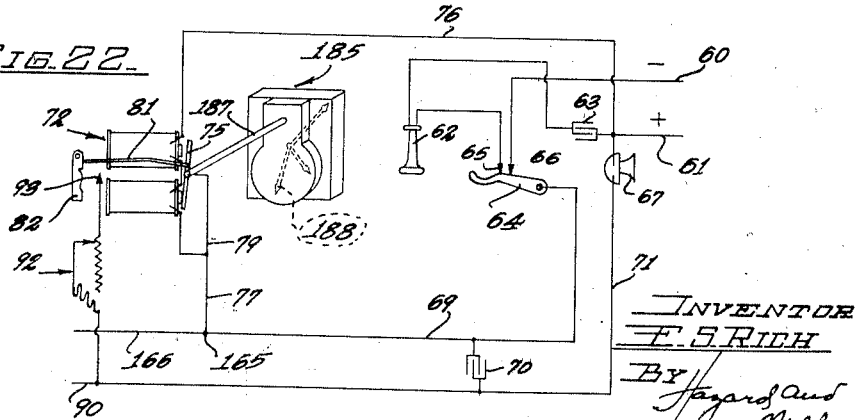
INVENTOR
F. S. RICH
BY Hazard and Miller
ATTORNEYS Patented Mar. 30, 1937

2,075,056

UNITED STATES PATENT OFFICE 2,075,056

METER

Frank S. Rich, Los Angeles, Calif.

Application May 7, 1932, Serial No. 609,859

50 Claims. (Cl. 179—7.1)

My invention pertains to a metered telephone service in which I endeavor to provide metering instruments taking into consideration the making of a connection by a subscriber for an outgoing call and also of the length of time the subscriber uses the service after the called subscriber has responded. By my type of metering service the subscriber pays for the service by an evaluation of the cost of making his outgoing connections and the time in which he has been using telephone equipment with a called subscriber. By my metering device no count is made or enumeration of the number of incoming calls to a subscriber or of the time for which his telephone is used for these incoming calls. This is on the basis that the subscriber is not responsible for incoming calls but the party who calls him will pay for this service. Therefore, by my metering system if every calling subscriber pays in proportion to the number of his calls plus the time he has used the telephone equipment, equitable rates can be established giving fair remuneration to the telephone company for the use of their plant equipment and their "going" business.

Current practice is to have a metered telephone service in which the number of outgoing calls are tabulated and a charge is made at so much per call. This is, however, not a fair basis of computation of cost either to the telephone company or to the individual subscriber because some subscribers may have a large number of calls with conversation of brief duration, whereas others may have a small number of calls and use the service for a long period of time. If both pay on the basis of the number alone of outgoing calls completed, it is manifest that there would be a great disparity between the bills of different subscribers for similar time use, and, moreover, the telephone company should be compensated both for making the initial connection and the exclusive use of a certain part of their equipment between the calling and the responding subscriber.

By my metering system and specific meter employed, no tally is made of the outgoing calls which are not completed, that is, should a line be busy or the called subscriber not respond, the calling subscriber is not charged for this. But by my metering system as soon as the called subscriber removes his receiver from the hook switch the time enumerator commences in operation and continues until either the called or calling subscriber cuts off the service. In order that a tally and, hence, a charge may be made for the connection, the time device is arbitrarily advanced a certain amount which is predetermined and constant for all subscribers for each call completed. Therefore, if the telephone rates are based on the time factor of my meter, this time factor includes an arbitrary time period to cover the cost of making a connection plus the actual time a subscriber has maintained this connection. Therefore, in my metering service a counting device may be utilized which operating in units of time and for each call the time units registered includes the actual time period from the making of the connection to the breaking of this, plus the arbitrary time factor for connecting the calling and called subscribers.

In devising a telephone meter service of the type above described, I endeavor to use instruments which may operate efficiently with standard telephone equipment and in conjunction with ordinary telephone service. In this regard there is a workable limit as to the amperage and voltage which may be used in the instruments of the meter and also in the closing and opening of switches in the meter. It is preferable that the time factor device be electrically operated to make a tally or count of units of time rather than to employ a mechanism of the type of a clock which would require either winding or electrical synchronization with alternating current circuits. In addition, the timing device of my invention is designed to operate with power derived through the telephone circuit from the telephone central station and to be such that this will not introduce extraneous noises or sounds in the telephone circuit while two subscribers may be engaged in conversation.

One of the objects and features of the timing instrument of my meter is the employment of an oscillating device having a conducting body of liquid, which liquid tends to maintain a level horizontal surface and the obtaining of this surface is regulated by the flow of a gas, this gas being so controlled that a predetermined period is required for the surface level of the body of liquid, after being tilted mechanically, to resume its natural level and be used as a timing factor. An electrical connection is made with opposite surface portions of the oscillating liquid body and circuits are established to an electro-magnetic device for oscillating the conducting liquid. The mechanical construction preferably involves a tubular structure having two arms and a lower portion carrying a relatively large body of conducting liquid, such as mercury, and an upper tubular connection between the arms having the gaseous medium with a suitable regulatable port for the flow of this gas. A pair of electrodes dip into the conducting liquid in the two arms, these electrodes being initially adjustable but located in a stationary manner in the arms, and such electrodes with the other electrical mechanisms are designed so that there is no abrupt change in the amperage or voltage of the current. A pair of solenoids are used as the electro-magnetic means for oscillating the tubular structure having the conducting liquid, there being, preferably, a pair of solenoids connected in a crossed-over manner to the two immersible electrodes whereby when one electrode is immersed to its limit and the other is partly immersed, and as the current will pass mainly through the electrode having the greatest immersion, its solenoid is energized to a greater extent than the other solenoid, and, hence, oscillates the tubular structure having the oscillating liquid body. As the period of oscillation may be accurately adjusted by regulating the flow of gas from one side to the other to allow the liquid to become level in both branches of the tubular structure, the device as a whole may be used as an accurate timing meter which is only brought into operation, as above mentioned, when a subscriber has his outgoing call completed. This oscillating device or structure may be used to operate a counter or enumerator, or moving hands giving a tally somewhat in the manner of a clock's hands.

In order to simplify the determination of a telephone charge, the indicator of the meter may be considered as giving an operative indication of service units which are a summation of a predetermined number of units for making the connection together with units for the time occupied by such connection. It is manifest, however, that, if desired, a separate tally or count may be kept of the connections, and another indicator used for the time factor.

In designing my meter, I have endeavored not to interfere with the telephone instruments and their efficiency in transmitting speech, and also to design a construction which will not require expensive alterations of the telephone plant but add certain instruments which may be installed as an addition to the present equipment. My meter also is of such design that it may be placed in the residence or place of business of the subscribers instead of at the central station. The meter may be installed at either or both ends of the subscriber's single party line, but in the case of a multiparty service is designed for use on the premises of the subscriber. However, in this case a meter could be installed at the central station to obtain the aggregate record of all the subscribers on the line.

My invention is illustrated in the accompanying drawings, in which:

Fig. 3 is a vertical section on the line 3—3 of Fig. 1 or 2 in the direction of the arrows.

Fig. 4 is a detailed section on the line 4—4 of Fig. 3, showing the operation of the call counting device.

Fig. 5 is a detailed section on the line 5—5 of Fig. 3, illustrating part of the time tallying device.

Fig. 6 is a detailed elevation of a trigger and detent connected to a relay in the position of an outgoing call.

Fig. 7 is a view similar to Fig. 6, showing the position on the completion of the outgoing call.

Fig. 8 is a vertical section of the oscillating switch, the supporting elements being omitted.

Fig. 9 is a section on the line 9—9 of Fig. 8 in the direction of the arrows.

Fig. 10 is a vertical section of another form of the oscillating switch.

Fig. 11 is an electrical diagram of the subscriber's end of the telephone circuit, illustrating the call counter relay and the time switch connection; the telephone and relay are shown in their neutral or non-calling position.

Fig. 12 is an electrical diagram showing the position of the circuits on the initiation of an outgoing call.

Fig. 13 is an electrical diagram showing the position of the circuits on the completion of an outgoing call.

Fig. 14 is an electrical diagram of the circuits on initiation and completion of an incoming call.

Fig. 15 is a vertical section through an automatic ballast resistor.

Fig. 16 is a chart showing curves for deriving the resistance of the internal circuits of the time switch.

Fig. 17 is a chart showing curves for deriving the current flow in the internal circuits of the timing switch.

Fig. 18 is a partial vertical section showing an alternative mechanical drive for advancing the service unit indicator by the oscillating time switch.

Fig. 19 is a detailed section on the line 19—19 of Fig. 18 in the direction of the arrows.

Fig. 20 is an electrical diagram of modified circuits for energizing the oscillating switch, together with a diagram of separate call counters and time indicator, showing the circuits in the open position of no call.

Fig. 21 is a portion of the diagram of Fig. 20, showing the circuits in the initiation of an outgoing call.

Fig. 22 is a partial circuit similar to Fig. 21, showing the condition on completion of an outgoing call.

Fig. 23 is a detailed section of a non-adjustable gas port.

Figure 1:
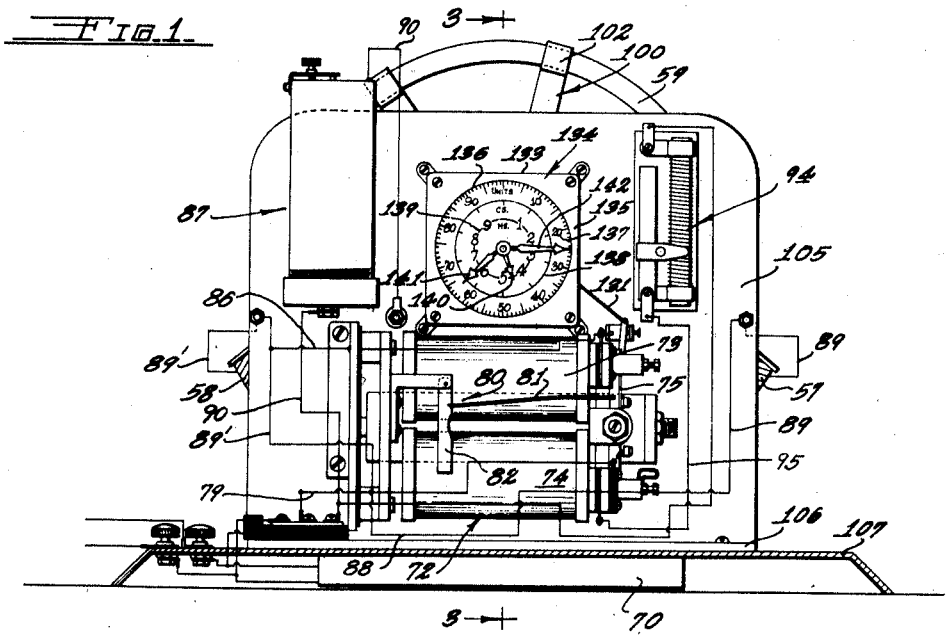
Fig. 1 is an elevation taken in the direction of the arrow 1 of Fig. 3, showing the indicator side of the instrument.

Before describing the assembly operation of my invention, I will set forth the certain details of construction in order that the assembled working may be more readily understood. In Fig. 8 I illustrate my preferred form of timing oscillator, this being designated generally by the numeral 11. It employs a closed tubular frame 12 having a lower section 13, two upright arms 14 and 15, and a cross or transverse connection 16 between these arms. In the lower section of the tubular frame there is a conducting medium, which is preferably mercury, indicated at 17. The arm sections 14 and 15 are provided with a small inner tube 18 through which extends a conducting stem 19, to which are attached the electrode resistors 20 and 20'. These resistors are preferably formed of carborundum compound, and the attachment is by means of a ring 21 in the lower end of the stem 19 engaging in a groove in a cylindrical section 22 of the resistor. The resistors are made somewhat of a conical shape having an apex 23 pointing downwardly, but these are preferably constructed with a curved surface 24, the electrical function of which is detailed hereinunder.

A partition 25 in the upper connection 16 is provided with a port or passage 25'. Through this passage extends a slightly tapered valve stem 26. This valve stem is secured to a rotatable magnet 27 and this is illustrated as having poles cylindrical on their outer face, as indicated at 28 (see Fig. 9). Secured to the other end of the magnet, there is a stem 29 which has a threaded end 30. This threaded end extends into a sleeve 31 which is attached to a bracket 32, which bracket has a firm attachment 33 to the upper tubular connection. The frame 12 may be made of glass if desired. A fixed terminal 34 is secured to the lower branch 13 of the tubular frame and makes a contact with the mercury. From this there is an electric lead 35. The stems 19 also have terminals 36 for lead wires 37 and 38.

The tubular frame may be tilted in a manner hereinunder described. The point of oscillation is indicated at 39. 40 designates a horizontal line which the surface of the mercury seeks to take when the device is tilted. 41 indicates a vertical line. In the position illustrated the oscillator is tilted to its maximum degree in one direction, in which it will be noted that the electrode resistor 20 has only a point contact with the conducting mercury, whereas the resistor 20' is immersed to a large extent. Therefore, the electric current will be carried mainly through the resistor 20' and, hence, through the lead wire 38, while the resistor 20 will carry but little current. In designing this construction the resistance of the immersed resistor is substantially zero and when only the tip is immersed it may be 20,000 ohms or more but still there is a slight current flow.

The relative position of the horizontal line when the oscillator is tilted in the other direction is indicated by the line 40'.

The timing of the oscillator, that is, the rate of flow of the mercury from one arm to the other to bring the level in the two arms to the horizontal, is governed by the flow of an inert gas in the arms and the upper connecting portion 16. This gas may be at or slightly above atmospheric pressure. The gas must flow through the port 25' which is governed by the stem 26 and this stem may be adjusted by rotating the magnet 27 and thus the threaded stem 29. Such rotation of the magnet may be done by means of a permanent magnet manipulated outside of the tubular connection 16. The tubular frame 12 is illustrated as being dielectric, such as glass, but metal could be used by insulating the electrode supports and connectors. As the rate of shifting of the mercury is thus dependent on the flow of the gas bearing on the surface of such mercury, it is obvious that I may obtain an accurate adjustment of the rate of shift of the mercury and, hence, of the oscillator, which is controlled as hereinunder detailed.

Fig. 10 shows a modified form of the tubular frame designated 42. This has a lower section 43, upright arms 44, a connection section 45 at the top, which section has an open end 46 which is closed by a plug 47. This plug has a sealing ring 48, an inner threaded section 49 through which extends the threaded stem 50, which has a slot 50a and a pair of fingers 50b. A tapered stem 51 has a neck 51a fitted between the fingers and a head 51b in the slot. A diaphragm 52 on stem 51 is sealed as indicated at 53 in the tubular frame. A partition 54 is secured at its peripheral edge in the tubular upper section 45 and this has a gas port 55 through which the stem 51 extends. Therefore, by adjusting the threaded stem 50 in the fixed plug 47, the size of the gas opening in the port 55 may be regulated, the diaphragm flexing. In this construction I show conducting stems 56 extending through the walls of the tubular arms 44 and these have rings similar to 21 for attaching the resistor electrodes 20 and 20'. In this case the electric leads are given the same numbers: 35, 37, and 38; as in Fig. 8.

In Fig. 11, I illustrate diagrammatically the connections of the leads 37 and 38 to the operating solenoids 57 and 58 of the oscillator. These are mounted in a stationary structure and the lead 37 from one of the resistors of the tubular oscillator is carried to the diagonally opposite solenoid 58, and the lead 38 from the other resistor is carried to the diametrically opposite solenoid 57. The frame which carries the tubular oscillator has mounted therein the core or magnate 59 of the oscillator. For purposes of convenience, this is illustrated as being partly circular with the ends extending into the center of the solenoids. In the position shown in Fig. 11, the solenoid 58 will be energized to a greater extent than the solenoid 57 and operate to rotate the magnet core 59 and reverse the position of the oscillator, and, as above described, it will then require a period of time for the level of the mercury to change and reverse the magnitude of the energization of the respective solenoids.

Reference is next directed to the details of the telephone connections and the energizing of the solenoids 57 and 58 to operate the oscillator. In Fig. 11, the circuit is illustrated as open with no incoming or outgoing call. The telephone lines to a central station are indicated at 60 and 61. Line 61 is illustrated as connected to the receiver 62 operating through a condenser or inductance 63. The hook switch 64 is in the open circuit position, the receiver resting on the hook. When the receiver is taken off the hook, the talking circuit contacts 65 and 66 are closed, giving a return circuit. The transmitter 67 is connected in the talking circuit by a connection 68 to the line 61, the lead 69 from the switch 64 through the condenser 70 and the lead 71.

If a subscriber makes an outgoing call, the connection is indicated in Fig. 12. The line 60 has a positive polarity and the talking circuit is through this line 60, the contacts 65, 66, and switch lever 64, the receiver 62, and the speaking circuit uses the leads 69, condenser 70, lead 71, the transmitter 67, and the connection 68 to the negative side of the line 61.

The manner in which a completed outgoing call operates a relay designated 72 is as follows: This relay is of a standard polarized type used in telephone operations, and has two electro-magnets 73 and 74 with a pivoted relay armature 75. A lead 76 is connected from the line 61 through the connection 68 to the coil 73. A continuing lead 77 is connected to the lead 69 and the switch 64, using the lead 78 to the other coil 74. These are used for energizing the coils 73 and 74, the purpose of which is to actuate a latch and a trigger device for opening and closing the circuit to the lenoids 57 and 58 of the oscillator timing device.

The circuit to the oscillator has the lead 79 which extends from the receiver switch 64 illustrated through the leads 69 and 77. This is connected to the armature 75 or a suitable device operated by such armature; and connected to operate with the armature there is a latch 80 which has a trigger arm 81 connected to the armature 75 to oscillate therewith. This engages with a pivoted detent 82. This detent is designed to hang vertically and has a notch 83 in which the end of the trigger 81 normally engages, as indicated in Fig. 11. The trigger 81, or a moving part connected with the armature 75, is used to make and break the circuit to the oscillator solenoids. An open circuit arrangement is designated by the numeral 84. This has a contact 85 designed to engage with the trigger 81 when this is in its uppermost position, as shown in Fig. 13, but these are in the open circuit position in both Figs. 11 and 12. A lead 86 extends from the contact through an automatic current regulator designated 87 and by leads 88 and branches 89 and 89' to the solenoids 57 and 58, respectively. The return circuit through the mercury and the central common lead 35 is by the connecting lead 90, which connects with the lead 71 and thus by the connection 68 to the line wire 61.

A short circuit cutout for the solenoids 57 and 58 of the timing oscillator is indicated at 92. This employs a contact 93 which is connected through a variable resistance 94 and a lead 95 to the connector 96 in the lead 90 and thus with the lead 71 forming a connection with the line wire 61.

Continuing the further description of the functions of the relay 72 in regard to outgoing and incoming calls, as above mentioned, when the telephone circuit is in disuse, the elements are in the position shown in Fig. 11, in which the talking circuit, through the switch 64, contacts 65 and 66, is open. The circuit 84 is open on account of the contact 85 being out of engagement with the conducting trigger 81. The short circuit connection 92 is closed through the connection of this conducting trigger 81 with the contact 93.

When a subscriber makes an outgoing call, the talking circuit is closed, as above mentioned, and the relay 72 is energized in such a manner as to tilt the armature 75 into the position shown in Fig. 12. This moves the trigger 81 downwardly. This action is because the line 60 has a positive polarity for an outgoing call, the positive connecting being through the contact 66, switch 64, leads 69, 77, and 78, to the relay; the return being through the lead 76 to the terminal 68 and the negative line 61. The action of the trigger 81 moving downwardly still maintains a closed circuit with the shunt or closed circuit connection 92 and still maintains an open circuit with the contact 85. Therefore, the timing oscillator is out of the circuit and no indication is given of the timing connection. When the called subscriber completes the call by taking his receiver off the receiver switch, the relay shifts to the position of Fig. 13. In this case the polarity of the telephone lines 60 and 61 change, 61 now becomes positive and 60 negative. The lead 76 is thus positive, giving a reverse energizing of the coils 73 and 74 and the leads 78, 77, 69, the switch 64, contact 66, is negative. This quick reversal of the relay 72 causes a quick upward movement of the trigger 81. This causes the trigger to jump the notch 83 in a manner hereinunder detailed and to close the circuit through contact 85, the circuit regulator 87, leads 88, 89, and 89', to the solenoids 57 and 58. It also opens the shunt bypass 92 by disconnecting the trigger 81 from the contact 93. Therefore, as long as the circuit is closed between the subscriber who has made the outgoing call and the party with whom he is connected, the oscillating timer will continue to oscillate on account of being energized. The oscillating armature 75 of the relay 72 is utilized to register the outgoing calls completed, this being done in a manner hereinunder detailed.

In Fig. 14, I indicate a condition in which an incoming call is made and answered. In the incoming call the lead in line 61 has a positive potential. Therefore, the relay is energized in such a manner tending to tilt the trigger 81 upwardly, the energizing being the same as in Fig. 13, but in this case the notch 83 of the detent 82 prevents upward movement of such trigger. Therefore, the shunt connection 92 through the contact 93 is maintained closed, and there is an open circuit in the circuit 84 through the contact 85 being out of engagement with the conducting trigger 81. Therefore, the timing device is not energized and no record is kept of the time of the incoming call. Also, as the armature 75 of the relay has been prevented from its oscillating movement there is no record made of this call. Hence, the subscriber is not charged either on the call or on the time for incoming calls.

In Figs. 6 and 7 I show enlarged details of the detent 82. The notch 83 has a square shoulder and immediately below this there is a hump 97, and below this a recessed or cutout section 98. Normally when the telephone is not in service and the trigger 81 is in the position of Fig. 11, this trigger is caught in the notch 83, shown in dotted lines in Fig. 6. When the relay 72 is energized in such a manner as to move the trigger 81 downwardly, the point of this trigger swings into the recess 98, as indicated in Fig. 6. This is the position when a subscriber makes an outgoing call but before such call is answered. Immediately, on the answer of the call the trigger 81 moves from the position shown in full lines in Figs. 6 and 12 to the position of Figs. 7 and 13, this being due to the immediate reversal of the polarity of the relay. When the point of the trigger moves quickly upwardly from the recessed cutout section 98 and engages the hump 97 and gives a quick flip outwardly to the detent 82 allowing the point of the trigger to clear the notch 83 and thus to move above the notch, this action causes a movement of the call counter and also energizes the time recording section of the meter. As above mentioned, on an incoming call the trigger being initially caught in the notch 83 and the energizing of the relay tending to move the trigger upwardly, it is restrained by such notch so that neither the trigger nor the armature 75 moves.

In order to afford an assurance that the trigger 81 in its quick upward motion will shift the detent sufficiently to allow the point of the trigger to clear the notch 83, it is preferable to connect the trigger to the armature 75 slightly above the center as indicated at 99 (Fig. 6). Therefore, when the armature is rocked into the position of Fig. 12, the trigger is given not only a rotational movement on the center of pivoting on the armature but a slight movement of translation. This swings the detent considerably out of the vertical and on the reverse motion in which the armature occupies the position of Fig. 13, the detent is given a quick impulse away from the trigger and at the same time the trigger is given a bodily movement away from the detent.

Reference is next directed to the mechanical construction by which the moving armature 75 is caused to operate an indicator and the timing oscillator also actuates the same indicator. Reference is directed particularly to Figs. 1 through 5, inclusive. The core or armature 59 as well as the tubular frame are mounted in a carrier frame 100. This is indicated as having straps 101 encircling the upper and lower branches of the tubular oscillator and having upper radial arms 102 and a lower radial arm 103. This lower arm, however, is connected to a non-magnetic insert 104 between the ends of the solenoid armature. A vertical plate 105 is indicated as having a horizontal flange 106 for mounting this on a base 107. From the plate 105 there extends a bracket 108, which bracket has a vertically depending flange 109. On this flange there is a screw threaded bearing pin 110 which forms a socket bearing for the needle bearing 111 on a horizontal spindle 112. This spindle is secured to a cross member 113 connecting the straps 101. The other end of the spindle has a point bearing 114 in the plate 105. These bearings may be formed of jewels, if desired. With my oscillator it is highly desirable that the center of gravity be slightly above the pivoted spindle and in order to adjust this accurately I have an adjusting screw 115 mounted on studs 116 on the radial arm 103 and on this there is an adjustable weight 117. Therefore, by raising and lowering this weight the position of the center of gravity may be adjusted.

The spindle 112 has a transverse arm 118 connected thereto, from one end of which there is a short pawl 119, and connected to the other end there is a longer pawl 120. These pawls engage a ratchet gear 121 which is mounted on an axle 122, which axle is journaled in the plate 105. Therefore, in the oscillation of the tubular frame and, hence, the carrying frame and spindle, which spindle is rigidly secured to the cross member 113, the gear 121 is given an intermittent motion of rotation in the direction of the arrow 123. These pawls may be adjusted so as to advance the gear 121 one half or more teeth at a time, this depending on the size and number of the teeth and the relation of the pawls thereto.

The armature 75 has a hook arm 124 connected thereto. This arm has a hook end 125 which engages a lever arm 126, this being pivoted at 127 to the plate 105 on the side opposite the timing oscillator, the relay 72 being secured to the back or opposite side of this plate. A yoke 128 secured to the plate 105 with adjusting screws 128a limits the stroke of the lever arm 126. The lever 126 is retracted by a retraction spring 129 secured to such lever and to a fixed stud 130 on the plate 105. A pawl 131 pivoted to the outer end of the lever 126 engages the teeth of a ratchet gear 132 also mounted on the shaft 122. The shaft 122 is connected to a timing gear train in the gear housing 133. It is unnecessary to illustrate the gear train as it is of an ordinary type. The indicator has a face 134 with a clock type of dial 135. This is graduated into units 136, there being 100 units to the complete dial. There are graduations in tens 137. A second scale 138 is graduated to hundreds, the tens numerals also indicate the hundreds. There is also an inner scale 139 graduated to thousands. The short hand 140 reads on the thousands scale, the intermediate hand 141 on the hundreds scale, and the long hand 142 on the units and tens. Therefore, the dial, as shown in Fig. 1, gives an indication reading 4625.

As above mentioned, the call counter actuated by the relay 72 actuates the indicator a certain amount. The pawl 131 may be adjusted as to its throw to rotate the gear 132 either one or more teeth and this may have a definite relation to the unit of time oscillation. In my appliance, as illustrated, I have timed the oscillator to tilt each direction in seven and one-half seconds, therefore taking fifteen seconds for complete oscillation, and the call counter may advance the indicator a certain predetermined number of time units. The purpose of having the adjustment for the call counter is to fairly proportion the charge to the subscriber for completing a call with reference to the value of the time units.

The ballast resistor 87 which I used is constructed as follows, having reference to Fig. 15. This has a solenoid winding 143. This is shrouded by an iron shroud 144 which has an outer cylindrical section 145, a top or cap section 146, and a depending central hub 147. The hub has a central bore, through which extends a pressure pin 148, which pin is engaged by a leaf spring 149, one end of which is attached as indicated at 150 to the side of the shroud and pressed inwardly by a thumb nut 151 on a threaded stud 152. Fitted in a floating manner inside of the solenoid there is a steel core 153. This core is preferably made of cobalt steel and has a tubular section 154 with a closure cap 155 on which the pin 148 bears. The core has a flange 156 at the bottom. This core is magnetized so that it substantially floats in the solenoid due to the attraction between the core and the shroud. In the inside of the core there is a carbon pile resistor 157, this being indicated as formed in separate blocks with a dielectric covering 158. The base 159 of the carbon pile is supported in a dielectric base block 160 which has a screw threaded connection 161 with the shroud. The lead 86 is connected by a terminal post 162 to the base of the carbon pile. A connection 163 extends from the core to one end of the solenoid winding and the lead 88 extends from the other end of the winding. This construction is illustrated in diagram in Fig. 11, in which the carbon pile is indicated as being under the pressure of a pivoted weight 164, the change in the pressure of this weight being governed by the solenoid winding 143. The purpose of this ballast resistor is to operate in governing or controlling the amperage which is delivered to the solenoids of the timing oscillator.

The dielectric base 160, by its adjustment, varies the air gap between the floating armature 156, which is preferably of cobalt steel, and the internal and external parts of the shroud 145 and 147, which is made of highly permeable iron. The pin 148 should be pressed downwardly by the thumb nut and the spring 149 until substantially a minimum resistance is obtained in the carbon pile 157. Then the energizing current through the solenoid, when it lifts the armature 156, reduces the pressure on the carbon pile and increases its resistance.

The solenoids of the oscillating timing switch are designed to operate with a maximum current which may readily be supplied by the standard telephone service, and I have found that thirty milliamperes may readily be obtained without drawing too great an amperage to the solenoids of the oscillating switch. When the calling subscriber is speaking into the transmitter, the current passing through this transmitter will increase, and by the use of this ballast resistor the timing switch is prevented from oscillating prior to the completion of the time for which the circuits and settings are designed.

The fundamental or primary purpose of the magnetic ballast resistance is to maintain more nearly constant current values in the timing device branch of circuits, despite the fact that it is one of two parallel circuits in series with the transmitter, which latter is a constantly varying rheostatic resistance. The transmitter passes the operating current of the central station. The operation of the transmitter both when subject to the voice and when quiet varies this operating current passed through the transmitter on account of the variable rheostat action of the transmitter. The ballast resistor, however, maintains a substantially constant current with varying voltage to the solenoids 58 and 59 which operate the timer.

In Figs. 20, 21, and 22, I illustrate circuits which may be considered as alternative to those of Figs. 11, 12, and 13. In Fig. 20, the telephone talking circuit is indicated as being open, that is, the telephone receiver is on the receiver switch holding the circuit open. In Fig. 21, the subscriber is initiating an outgoing call, has removed his receiver and closed the talking circuit through the transmitter switch 64. This causes an energizing with a positive polarity of the lead 69. From this lead 69 there are the connecting leads 77 and 79 to the armature 75. From the connecting point 165 a lead 166 is taken to the ballast resistor 87 and from thence to the oscillating timing switch in the same manner as in Figs. 11, 12, and 13.

With this circuit there is no make and break contact operated by the oscillating armature of the polarized relay 72 so that by this circuit the solenoids 57 and 58 are always energized. However, when the subscriber makes a call and employs the circuit of Fig. 21, the current passing to the armatures of the oscillating time switch is in such a direction as to maintain this switch in its tilted position. In other words, the current is of the wrong polarity to tilt this switch. In this case the line 60 is positive and the line 61 negative. On completion of the call, the polarity of these lines changes and 61 becomes positive and 60 negative. This changes the polarity of the current through the solenoids 57 and 58 and causes these to oscillate the oscillating timing switch. The armature of the polarized relay 72 is also shifted, which causes a break in the contact 93 of the shunt circuit 92. Therefore, this shunt circuit is opened and the oscillating switch continues to oscillate in its periodic movement as long as the circuit is closed between the calling and the replying subscriber. When the shunt circuit is closed as in the position of Fig. 21, the shunt circuit 92 carries the main portion of the current but, as above mentioned, this is of the wrong polarity to operate the oscillator switch, although the oscillator switch is in parallel to the shunt circuit.

With the timing switch circuit and the shunt circuit 92 in parallel, the operation of a calling subscriber cannot open the shunt circuit because the polarized relay is energized in such a manner as to move the trigger against the notch in the detent and, hence, the armature 75 and this trigger 81 remain immovable, this being a similar action to that described in connection with Fig. 14.

As above mentioned, the relay 72 is a standard polarized relay type and the trigger 81 is an added element. The various contacts with this are illustrated diagrammatically as being with the trigger but it will be understood that this is a diagrammatic illustration and, in practice, I find it desirable to make the contacts by conducting elements on the armature 75. The design may be such that the relay makes and breaks the different circuits and is arranged itself to operate the trigger for engaging and disengaging the detent 82.

In Figs. 18 and 19 I show a modified construction for driving the shaft 122 by the oscillating spindle 112 of the timing switch. This spindle, in Fig. 18, is illustrated as having a rocking arm 167 which has a slot 168 at the end, and through this slot extends a screw 169 which has an adjusting head at the end of the arm. On this screw there is a nut 170, to which is connected a transverse spindle 171. This spindle carries two links 172 and 173, each of which has a pawl or dog 174 connected to a pivot pin 175 mounted in an oscillating yoke arm 176 oscillating on the shaft 122. A spring 177 connected to the arm 176 presses on the pawl 174, which bears on the periphery of a smooth-surfaced wheel 178, such wheel rotating in the direction of the arrow 179. In the oscillation of the spindle 112 and, hence, of the arm 167, the links 172 and 173 operate to alternately bring their pawls into a pressure engagement with the periphery of the wheel 178, and thus rotate this wheel in the direction of the arrow 179. The throw of the links 172 and 173 may be adjusted by means of the adjusting screw 169 and, hence, a greater or lesser movement of the timing indicating hands or other mechanism of the timing unit may be made for each oscillation of the timing oscillator switch. It is obvious, of course, that in the construction of Fig. 5, a plurality of pairs of pawls could be used and a ratchet wheel for each pair with the teeth staggered so that partial adjustments could be made.

It is desirous to have an adjustable stop to limit the oscillation of the tubular frame and the armature 59. Therefore, I may attach to both arms of this armature adjacent the solenoids adjustable collars 180, these being attached by set screws 181. Secured to each collar there is a bimetallic thermostatic strip 182 and each of these strips has an adjustable contact pin 183 adapted to engage the end of the solenoid and limit the oscillating movement. The use of the thermostatic metal is to advance or retract the stop to compensate for any possible influence of temperature on the timing device, as the angle of inclination of the switch affects the hydrostatic head of the mercury and, if glass, such as pyrex glass, is used, the coefficient of expansion is greater than that of the tubular glass structure. It is obvious, however, that the tubular frame structure in which the mercury is contained may be made of a conducting metal if the connectors for the resistors are insulated, or it may be made of some dielectric material other than glass.

It will be noted by the above description of my oscillating mercury switch in which the resistors are immersed and partly withdrawn from the mercury that the contact is never broken. Therefore, on account of there being no make and break in the circuit there is no sharp click in the subscriber's receiver, which would be the case if the circuits were absolutely opened and closed. The solenoids for oscillating the mercury time switch are energized in a differential manner, that is, when one is fully energized to exert a force for oscillating the tubular frame the other solenoid has a minimum current passing therethrough. However, it is desirable that the sum of the currents be substantially constant so there will be no decided quick fluctuations in the current which might produce a sound in the receivers. In Fig. 17 I illustrate a curve for illustrating and calculating the current flow through the resistors of the oscillating switch. In this curve the ordinate represents milliamperes and the abscissa may represent the distance $h$ (Fig. 10), that is, the amount of immersion of the resistors, but as the degree of immersion of the resistors is proportioned to the time of oscillation and thus the period of the oscillation may be represented as a function of time and as being a cycle, the time may be represented in circular measurement in which 90 degrees equals pi/2 radians. The current in one curve is indicated by $I'$ and the current in the other curve by $I''$. The formulas for the currents are $I'$ varies as $sine^2$ time, and curve $I''$ varies as $cosine^2$ time. The summation of these curves and currents $I$, the summation curve, equals $I'$ plus $I''$. I have found, in practice that I may readily use a current in the solenoids of the oscillating switch up to thirty milliamperes. In the curve of Fig. 16 I illustrate a manner of calculating and deriving the resistance of the resistors. In this case the ordinate is in ohms and the abscissa in terms of time. These curves are drawn on the formula of $R'$ varies as $cosecant^2$ time, and $R''$ varies as $secant^2$ time. In practice I have designed the resistors to have a maximum resistance of values over 20,000 ohms.

In Figs. 20, 21, and 22, I illustrate diagrammatically a call counting indicator 185 and a time indicator 186. In regard to the call indicator, the shaft 187 which is oscillated by the oscillating armature of the relay actuates, through a suitable gear train, the hands or other indicating devices 188 of this indicator. In regard to the time indicator a shaft 189, which is oscillated during the oscillation of the tubular mercury switch operates the hands 190 of a timing device. By this construction and operation the call count and the time are kept as separate elements in computing the charges to be paid by a subscriber. The calls are only registered on completion of an outgoing call and the tally is cumulative and also as the time indicator only operates during the period of an outgoing call and this is a cumulative record, the subscriber is apprised not only of the number of calls he has made but the cumulative time of such calls. The payment for the telephone service may, therefore, be computed on a charge made for completing each outgoing call and an additional charge computed on the basis of time units. Dividing the charge for the service into two distinct elements may be of advantage in arriving at a basis of charge for the calls computed relative to time and, therefore, a connection such as shown in these figures may be utilized until a proper relation is obtained between the calling and the timing charge. I believe, however, that it is desirable when such relation is established to use only one registering or recording device which may be graduated in units of service and forms a summation both of the calls and of the time consumed in such calls.

Figure 2:
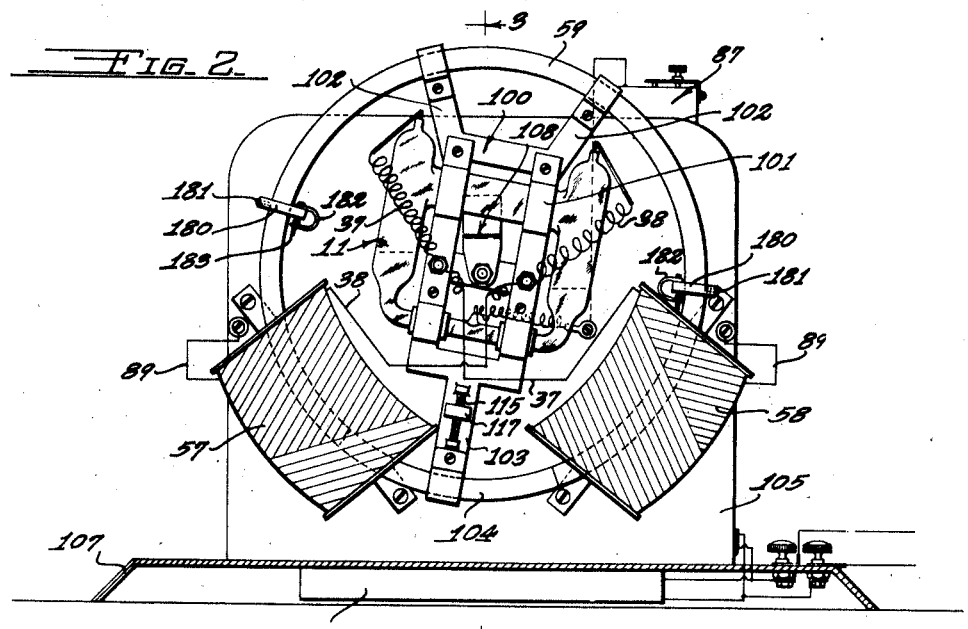
Fig. 2 is an elevation taken in the direction of the arrow 2 of Fig. 3, showing the opposite side of the instrument.

In Figs. 1 and 2 I have indicated the ballast resistor 87 as being in the line 90 of Figs. 11 and 20 instead of in the connections 86 and 88 of Fig. 11, or 88 of Fig. 20. It is immaterial as to which side of the circuit this ballast resistor is installed. If it is found desirable, the polarized relay may be constructed to have a sluggish operation, as by applying a copper shroud for a slow release to prevent operation on the so-called flashing due to the operation of a respondent's transmitter switch. This relay may have a hold-up circuit of higher resistance value than the pull-up circuit. The reversal of polarity in the circuits may be caused either by an automatic exchange operation or by a manual control in manners well known in telephone construction.

It is to be noted that the timing meter is connected in series with the subscriber's set behind the transmitter switch. Hence, the circuits through the meter may be considered as parallel branches in a series circuit. Regardless of whether the meter is recording or not a path or paths exist for the transmission of voices and operating currents. The inductive resistances of the circuits for the timing indicator are shunted by non-inductive resistances or condensers to by-pass the voice currents. It is desirable that the time or unit of service indicators, or the call indicator, should operate with unvarying energy requirements. This may be done by employing gear trains with hands or the like so that no additional energy is required to shift from units to tens, tens to hundreds, and hundreds to thousands of units, etc. It will be noted by my oscillating timing device actuated by the energized solenoids that when this device is left inactive by an open circuit for a short time, that immediately on completion of an outgoing call the tilting tube having the mercury is tilted. This gives an immediate advancement of the unit of service indicator or time indicator.

The indicated units of time or service may be considered as forming part of the charge for making a call or they may be considered as the calling subscriber having a charge registered against him in advance. In order to divide the period of oscillation into short terms I find it desirable to construct the instrument to oscillate every seven and one-half seconds. Hence, it may be that the call will be terminated at any time after one tilting of the frame, which has given a time indication. If a time charge is made against the calling subscriber from the first tilt of the time indicator, such calling subscriber will be slightly overcharged when his call is terminated prior to the completion of a seven and one-half second period. However, this is a short period of time and the cumulative amount of these small overcharge periods would amount to but little. It is, therefore, an advantage to have the initial tilting of the time indicator operate as part of the unit of service record for completing the call. By this system it may be considered that the calling subscriber's time meter operates at the end of the seven and one-half second periods and a small error on the terminating of this call would be borne by the telephone company. It will, therefore, be seen that it is an apparent advantage to have a common unit of service meter which is advanced both by the call indicator and the time indicator instead of having these latter two as separate units.

From the above description of my invention, together with the drawings, it is believed it will be seen that I have provided for a just, equitable, and what should be an acceptable rate making method for telephone service. It gives precisely accurate records and the recording meters may, as above mentioned, be at the subscriber's residence or place of business instead of at the central station, thus creating a more favorable disposition to this type of service by the subscriber. I believe that the mechanical and electrical instruments which I use and provide are durable and dependable, and my equipment does not require any revolutionary or costly changes in the telephone system, but merely additions thereto, and that these can be added to the telephone service without detracting from the high efficiency of telephone equipment or the service therefrom. I have developed instruments which may be operated by the small amount of electric energy available and thus do not place an additional tax on the power supply of the central station. I also believe that the device is acceptable for economical reproduction in quantities, and in such case it is to be borne in mind that the physical aspects of my invention may be materially changed from that illustrated and described herein. The instruments and their connections can also be readily installed, operated, and maintained.

In Fig. 23, I show a non-adjustable gas port through the partition 25 having a port 25' in which a wire stem 191 is fitted through the port. This stem has the ends given a reverse bend, as indicated at 192 so that the ends on the opposite side of the partition retain the stem in the partition.

One of the purposes of having the stem extend through a port in the partition is to form a substantially annular space or a narrow space surrounding the stem. This causes less likelihood of the mercury clogging the port should the timing device become inverted in transportation than if a smooth hole without any stem were utilized. Also, with the non-adjustable stem of Fig. 23, this will have a slight movement so that any mercury which might possibly lodge in the port will be loosened therefrom. Manifestly, in the adjustable stems these can be centered in the port and have a small annular space surround the stem, and by their adjustable features they will disclodge any mercury which may clog the port.

A means for compensating for the possible effects of temperature on the function of the timing switch may be obtained by a thermostatic advance or retraction of the stems controlling the gas ports. In Fig. 8 this may be accomplished by forming the supporting bracket 32 of a bimetallic thermostatic strip. This, then, will open and close the port due to temperature changes.

As I have endeavored to design the various electrical and mechanical features of my invention to operate efficiently and particularly the electrical devices to have a high electrical efficiency in order that they will not require current values greater than may readily be drawn from the telephone circuits now in use, I may state that while the armature of the oscillating switch may be of a material of high magnetic permeability, such as iron, which is magnetized only by induction, it is preferable, in the interests of higher mechanical efficiency and economy of materials to utilize a permanently magnetized armature. I find it of advantage to use, and in my present instruments have used, cobalt steel, because its characteristics include higher value of magnetic remanence and coercive force. The cobalt armature is consequently less susceptible to demagnetization in service on exposure to fields of magnetic force wherein the value of the magnetic field of solenoids in this case are negative with respect to the values of residual magnetism or flux density of the permanent magnets.

In the polarized relays, I have used those of standard manufacture having a permanent magnet of tungsten alloy steel, but I believe that the use of cobalt steel will permit the fabrication of a smaller and more efficient relay.

In the claims where I have designated the completion of an outgoing call, such means the completing of the circuit which allows the carrying on of a conversation of such outgoing call and not the termination of such call. This is the equivalent of the closing of the circuits on an outgoing call being answered.

Various changes may be made in the details of construction without departing from the spirit or scope of the invention as defined by the appended claims.

I claim:

1. In a telephone service having a talking circuit with a source of power and including a transmitter switch, the combination of a relay, said relay being operated in a first manner on answering of an incoming call and in a second manner by answering of an outgoing call, an outgoing call operative means operated by the relay on the answering of an outgoing call when moved in its second manner, a timing indicating device having means for completely electrically operating the same, and means actuated by the relay to supply energy when such relay is actuated in said second manner of an answered outgoing call, said relay having means for stopping the timing device on breaking of the outgoing call.

2. In a telephone service as claimed in claim 7, a unit of service indicator actuated by the call operative means independent of the actuation of the timing device and, in addition, by the timing indicating device to give an indication involving the summation of both the completion of the call and the time extent of such call.

3. In a telephone service having a central station connection with a talking circuit connected thereto, a source of power at the central station and including a transmitter switch, the combination of a first electro-magnetic means actuated by current over the central station connection when said switch is closed to actuate a call indicating device, a second electro-magnetic means operated by current over the central station connection to actuate a time indicating device, the electric current for supplying said electro-magnetic means being controlled to actuate said electro-magnetic means independent of giving a sound indication through the talking circuit.

4. In a telephone service having a central station connection, by which connection power is supplied, and having a talking circuit with a transmitter switch, the combination of a relay operated on completion of an outgoing call, a call indicating means operated by said relay, an electro-magnetic means controlled by the operation of the relay to energize said electro-magnetic means to an operating condition on completion of the outgoing call, the electro-magnetic means being operatively connected to drive a time indicator, electric connections from the electro-magnetic means and the relay to the central station connection to derive power therefrom, an electric control means in the circuits of said electro-magnetic means to vary the current therein without giving an audible signal in the talking circuit.

5. In a telephone service having line connections to a central station for deriving power there-over, and a talking circuit partly over said connections and including a transmitter switch, combined with electro-magnetic means, a control means therefor actuated on completion of an outgoing call to energize said electro-magnetic means to an operative condition with power derived from the central station connection, a timing device actuated by said electro-magnetic means to indicate the time period of the continuance of such outgoing call, the circuit of said electro-magnetic means having control and governing connections to change the current for operating said electro-magnetic means without transmitting a current through the talking circuit which would give an audible signal.

6. In a telephone service having central station connections and a talking circuit connected thereto, the talking circuit including a transmitter switch, the combination of a timing device having a continuous oscillating tube with a conducting liquid in the bottom and a gas for controlling the flow of such liquid in the top, electrodes positioned to be immersed and partially withdrawn from the liquid, a pair of electro-magnetic coils, an operative connection between said coils and the continuous tube to oscillate said tube on the energizing of one coil to a greater extent than the other, and means controlled by the closing of the transmitter switch on an outgoing call and the completion of such call to initiate the energizing and operation of the electro-magnetic coils, the electrodes having current conducting characteristics to vary the current through said coils in such a manner as to cause no current changes in the talking circuit to give an audible indication.

7. In a telephone service having central station connections adapted for the supply of power, a talking circuit connected thereto including a transmitter switch, the combination of a polarized relay, a power circuit through the transmitter switch to said relay, the relay having a movable armature operated in a first direction by an outgoing call and in a second direction by completion of such call on the reversal of polarity in the central station connection, a trigger connected to the armature engaging a detent to restrain the movement of the armature on an incoming call, means actuated by the armature on completion of an outgoing call to give a call indication, a timing switch having a pair of fixed solenoids, an oscillating closed tube with mercury in the bottom of the tube and a gas having a controlled flow in the top, a plurality of fixed resistors in the tube for immersion and partial withdrawal from the mercury, an armature connected to said tube and actuated by the solenoids to tilt the tube, an electric circuit controlled by the polarized relay and operating through the transmitter switch to initiate the operation of the solenoids on completion of an outgoing call and to discontinue their energizing for operation on breaking of such call, a ballast resistor in the circuit of the solenoids, the ballast resistor and the immersible resistors having characteristics of giving a substantially even current flow through the circuit of the solenoids and thereby preventing sharp fluctuations of current or make and break of the current which would produce a sound in the talking circuit, and means operated by the oscillation of the tube by the solenoids to give a time indication.

8. In a method of telephone communication, using the central station connection and part of a talking circuit as a power supply line and on completion of an outgoing call utilizing the energy of the central station to actuate a call count indicator, in addition employing the power from the central station over part of the talking circuit to operate a timing indicator distinct from the call-count indicator from the completion of the outgoing call to the breaking of such call, and causing a substantially constant current to actuate the time indicator to eliminate any sudden changes of energizing of the talking circuit which might cause extraneous noises due to the operation of the timing indicator.

9. In a telephone service, a timing device comprising a continuous closed tube with a bottom, two sides, and a top portion, and having an armature connected thereto and mounted for a tilting motion, said tube having a conducting liquid in the bottom and a gas in the top, a port for the passage of the gas, a resistor in each side portion of the tube, a pair of solenoids positioned relative to the armature to influence the armature on energizing the solenoids to tilt the tube, and said resistors being adapted for immersion and partial withdrawal from the conducting liquid, said resistors having connections to the solenoids in a manner to maintain a substantially constant current through both solenoids but to cause a change in the energizing of each solenoid to thereby periodically tilt the armature and the tube, the change of the energizing of the solenoids being in proportion to the immersion of the resistors in the conducting liquid.

10. In a telephone service as claimed in claim 9, a controlling stem for the gas port being adjustable longitudinally and having a mounting within the tube and responsive to an external power for advancing and retracting the stem to regulate the cross sectional area of the port.

11. In a telephone service having a talking circuit with a transmitter switch, a polarized relay having a tilting armature, a trigger connected to the armature, and a detent having a shoulder engaging the trigger, means operative by closing of the transmitter switch on an incoming call due to the polarity of such call to energize the relay and retain the trigger in engagement with the detent and thereby prevent movement of said armature, said relay being energized on first closing the transmitter switch on initiating an outgoing call to release the trigger from the shoulder by energizing the relay in one direction and on completion of the outgoing call to energize the relay in another direction and move the trigger past said shoulder and thereby oscillate the armature, and means operatively connected to the relay armature to give a call indication.

12. In a telephone service as claimed in claim 11, a time indicating device having a closed tube mounted for oscillation and having a conducting liquid in the bottom, a gas controlled as to its flow in the top, and immersible resistors in each side, a pair of solenoids having a connection through the resistors and mounted to oscillate said tube, connections for energizing the solenoids on movement of the relay armature, and having a power connection through the transmitter switch whereby on tilting of the armature of the relay on completion of an outgoing call said solenoids become energized and continue energized until the circuit is broken through the transmitter switch on breaking of the call and hence of the talking circuit.

13. In the method of telephone communication in which there is used a telephone central station connection including a talking circuit with a caller's and respondent's transmitter switch, central station electrical power, a polarized relay operating a call indicator, and an electro-magnetically operated time indicator, comprising energizing the relay in one direction by closing of the caller's transmitter switch and in another direction on closing of the respondent's transmitter switch to complete a call indication, causing the relay when operated by the respondent's transmitter switch to energize the electro-magnetic parts of the time indicator sufficiently to operates same, and continue such energization to operate the time indicator until the caller's or respondent's transmitter switch is opened, and operating such electro-magnetic part of the time indicator with current through part of the talking circuit without any abrupt or distorted changes in the energy in such talking circuit which might produce an audible signal due to changes in the energizing of the electro-magnetic part of the time indicator.

14. In a method of telephone communication using a central station connection and part of a talking circuit as a power supply line and on completion of an outgoing call utilizing the energy of the central station to actuate a unit of service indicator integrating a call and time, continuously employing the power from the central station over part of the talking circuit to operate the unit of service indicator on a time basis from the completion of the outgoing call to the breaking of such call, and causing a substantially constant current to actuate the time indicator to eliminate any sudden changes of energizing of the talking circuit which might cause extraneous noises due to the operation of the timing indicator.

15. In the method of telephone communication in which there is used a telephone central station connection including a talking circuit, central station electrical power, a polarized relay operating a call indicator, an electro-magnetically operated time indicator distinct from the polarized relay controlled in its operation by the polarized relay, comprising energizing the relay in one direction on calling the respondent and in another direction on the response of such respondent, causing the relay when operated by such response to energize the electro-magnetic parts of the time indicator sufficiently to operate same and to continue such energization to operate the time indicator until the caller or respondent opens the circuit, and operating such electro-magnetic part of the time indicator with current through part of the talking circuit without any abrupt or distorted changes in the energy of such talking circuit which might produce an audible signal due to changes in the energizing of the electro-magnetic part of the time indicator.

16. In the method of telephone communication in which there is used a telephone central station including a talking circuit with a caller's and respondent's transmitter switch, central station electrical power, a polarized relay, and an electro-magnetically operated time indicator distinct from the polarized relay, comprising energizing the relay in one direction by closing of the caller's transmitter switch and in another direction on closing of the respondent's transmitter switch, causing the relay when operated by the respondent's transmitter switch to energize the electro-magnetic parts of the time indicator sufficiently to operate same and to continue such energization to operate the time indicator until the caller's or respondent's transmitter switch is opened, and operating such electro-magnetic part of the time indicator with current through part of the talking circuit without any abrupt or distorted changes in the energy in such talking circuit which might produce an audible signal due to changes in the energizing of the electro-magnetic part of the time indicator.

17. In a telephone service having means for initiating by a caller and answering by a responder, a call combined with a call indicating device automatically actuated on answering of the call by the responder and time indicating device automatically initiated on answering the call by the responder and stopped on discontinuing the call, a talking circuit portion uninfluenced by any sound derived from operation of the time indicating device.

18. In a telephone service as claimed in claim 17, means to combine the indicating of the call and the time indicating period of such call in a single integrating meter.

19. In a telephone service having means for initiating an outgoing call by a caller and answering such call by a responder, combined with an automatically actuated call indicator initiated in operation on answering the call by the responder, and having means for additively showing the answering of the call and similar calls, and an automatically actuated time indicator having means for starting the operation of such indicator only when the call is answered by the responder and stopping the time indicator when the call is discontinued, a talking circuit having means uninfluenced by any fluctuations of electric current caused by operation of the time indicator.

20. In a telephone service as claimed in claim 19, the call indicator and the time indicator having a common unit of service indicator integrating both the call plus the time, such unit of service indicator being actuated by the call indicator and by the time indicator.

21. In a telephone service having means for initiating by a caller and answering an outgoing call by a responder, a meter indicating units of service, a first count operating means for the meter automatically actuated on the answering of the call by the responder to advance the indicator of the meter a predetermined amount, a timing means automatically actuated on answering the call by the responder and stopped on breaking the call to advance said service indicator an amount representing the length of time of such call, and a talking circuit having means uninfluenced by any fluctuations of electric current caused by operation of the time indicator.

22. In a telephone service as claimed in claim 21, the telephone service having a circuit with a source of power at a central station and auxiliary stations interconnected with telephone transmitter switches of the caller and responder to actuate the first operating means for the call count and the timing means for the time count.

23. In a telephone service having a central station connection with a talking circuit connected thereto, a source of power including transmitter switches for a caller and respondent, the combination of a relay actuated by current over the central station when the switch is closed, a trigger connected to the relay to operate therewith, a detent to restrain the trigger, said detent restraining the trigger from movement on reception of an incoming call, said relay and trigger moving in one direction on closing of the caller's transmitter switch and operating the trigger the opposite direction on closing of the respondent's transmitter switch, the movement of the trigger shifting the position of the detent, a call indicating device operatively connected to the relay to register a completed outgoing call, an electromagnetic means operated by current over the central station connection to actuate a time indicating device, means controlled by said relay for opening and closing the circuit to said electromagnetic means of the time indicator whereby on completion of an outgoing call the time indicator is continuously operated until the circuit is broken at either of the transmitter switches.

24. In a telephone service as claimed in claim 23, said time indicator having a shaft with a drive connection between the time indicator and said shaft to rotate the shaft a predetermined amount at each operation of the time indicator, the call indicator having a separate and different connection to the same shaft to rotate said shaft a predetermined amount for each actuation of the call indicator, and a common indicating means giving a total of the movement of the shaft both by the call indicator and by the time indicator.

25. In a telephone service, a relay having a trigger connected thereto, a detent operative in conjunction with the trigger, means to energize the relay in one direction by an incoming call, said detent having means to restrain the movement of the trigger and prevent operation of said relay, said relay being energized in the opposite direction by an outgoing uncompleted call, said detent being movable to permit movement of the trigger, said relay being energized in the first manner on completion of an outgoing call, said trigger and detent having means on quick reversal of the relay to shift the trigger out of a restrained position with the detent.

26. In a telephone service as claimed in claim 25, a call indicating device operatively connected to the relay and actuated thereby when the trigger is moved to an unrestrained position in connection with the detent, an electrically operated time indicating device, and means to open and close the circuit to the time indicating device by the movement of the relay.

27. In a telephone service, a relay having a movable armature with a trigger connected thereto, a pivoted detent having a notch, a hump below the notch and a recess below the hump, the trigger being normally engaged in the notch when the circuit is inactive, the relay urging the armature and the trigger into an upward movement on completion of an incoming call but said notch preventing movement of the trigger and armature, the armature being urged and the trigger moved in a downward direction on closing a circuit for an outgoing call, and the energizing of the relay being quickly changed on completion of the outgoing call whereby the armature is moved and the trigger shifted upwardly, the engagement of the trigger and the hump displacing the detent sufficiently to move the trigger past said notch.

28. In a telephone service as claimed in claim 27, said armature of the relay being pivoted and the trigger being connected to the relay at a position at one side of the pivot whereby in an oscillating movement of the armature the trigger has a combined oscillating movement and a movement of translation.

29. In a telephone service as claimed in claim 27, a call indicating device having a shaft, a ratchet wheel thereon, a lever arm with a pawl to operate the ratchet, and an operating connection between the armature of the relay to actuate said lever.

30. In a telephone service having a relay with an armature, a trigger connected thereto, and a detent operative with the trigger, said detent restraining the trigger and the armature from movement on energizing of the relay due to an incoming call, said relay and trigger being operative in one direction to release from the detent on initiation of an outgoing call and quickly moved in a reverse direction and into a released position relative to the detent on completion of an outgoing call, a call indicator having a shaft, and an operative connection between the armature of the relay and said shaft to rotate the shaft on completion of the outgoing call.

31. In a telephone service as claimed in claim 30, an electrically operated time indicator, means to close the circuit to said indicator on movement of the armature and trigger on the completion of the outgoing call, said time indicator being continuously operative during the period of the completed outgoing call, an operative driving connection between the time indicator and said shaft connected to the call indicator whereby both the call indicator and the time indicator actuate the same shaft.

32. In a telephone service, a relay, a call indicator operatively connected to the relay, an electro-magnetic actuated time indicator, means to energize both the relay and the call indicator from a central station, a talking circuit, means operative on completion of an outgoing call on the talking circuit to energize the relay to actuate the call indicator, said relay when so energized closing a circuit to actuate the time indicator, means to automatically control the current to the time indicator whereby there are no sudden fluctuations or make and break in such circuit which would cause an audible sound in the talking circuit.

33. In a telephone service, a relay, an electromagnetic time indicator distinct from the relay, connections to a central station through part of a talking circuit to the relay, a shunt circuit controlled by the relay, and a circuit to the time indicator controlled by the relay, said shunt circuit being closed on an incoming call and opened on a completed outgoing call, and means to actuate the electro-magnetic device of the time indicator whereby there are no sudden fluctuations or make and break in the circuit indicator as would cause an audible sound in a talking circuit.

34. In a telephone service, a timing device having a continuous oscillating tube with a conducting liquid in the bottom and a gas in the top, a partition having a port through which gas may flow, a controllable valve stem to regulate the opening of the port, a pair of electrodes positioned to be immersed and partly withdrawn from the liquid, a pair of electro-magnetic coils, an operating connection between said coils and the continuous tube to oscillate said tube on the energizing of one coil to a greater extent than the other.

35. In a telephone service as claimed in claim 34, said stem having a magnet connected thereto, a stem on the magnet engaging in a sleeve, and said magnet being rotatable by a magnet external to the tube.

36. In a telephone service as claimed in claim 34, said valve stem being non-rotatable and connected to a diaphragm, and means exterior to the tube to flex the diaphragm and thereby shift the valve stem in relation to said port.

37. In a telephone service, a continuous tube having a conducting liquid in the bottom and a gas in the top, a partition having a port through which the gas may flow, a wire extending through said port and engaging the partition to prevent displacement of the wire, said wire preventing clogging of the port by the liquid, and means to oscillate said tube.

38. In a telephone service as claimed in claim 37, the means to oscillate the tube including a pair of electrodes positioned to be immersed and partly withdrawn from the liquid, a pair of electro-magnetic coils, an operative connection between said coils and the continuous tube to oscillate said tube on energizing of one coil to a greater extent than the other.

39. In a telephone service, a tube having a partition with a port through which gas may oscillate, said tube being sealed to the external air, a valve stem having one portion in operating connection with the port and another portion having a threaded connection with the supporting structure, and a magnetized means for rotating the stem by a magnet exterior to the tube.

40. In a telephone service, a tube having a partition with a port, a diaphragm sealing the tube from external air, a reciprocable valve stem mounted on the diaphragm and positioned to control the port to regulate the flow of gas therethrough, and means operated from the exterior of the tube to flex said diaphragm.

41. In a telephone service having a movable tube with a port therein for passage of gas, said tube having a liquid therein, a wire extending through the port and restrained by the partition to a limited movement whereby on movement of the tube said wire may dislodge any globules of liquid tending to block said port.

42. In a telephone service, a time indicator having a closed tube with liquid in the bottom and a gas in the top, a partition having a port, means operative in conjunction with said port to prevent blocking of the port by globules of liquid, a pair of resistors secured to opposite sides of the tube, said resistors being tapered from the top downwardly, an electrode connected to the tube constantly immersed in the liquid, means to pass a current through said electrode, the liquid, and the resistors, and electro-magnetic means actuated by the current and having an operative structure to oscillate the tube, each resistor always having a current passing therethrough, the amount of current decreasing as the resistor is withdrawn from the liquid and increasing as the resistor is immersed in the liquid.

43. In a telephone service, a time indicator having a pair of solenoids, an arcuate core operating through the center of both solenoids, a carrier frame having a pivotal mounting for the core, a secondary frame mounted on the carrier frame and having a continuous tube with two parallel sides, a liquid in the bottom, gas in the top, resistors positioned in the sides to engage the liquid, an electrode connected at the bottom to the liquid, electric leads from the solenoids to the resistors, and means to change the relative energization of the solenoids to rock the core and hence the carrier and secondary frames.

44. In a telephone service as claimed in claim 43, thermostatic bimetallic strips secured to the core, a limit means to engage said strips and thus vary the travel of the core due to changes of temperature.

45. In a telephone service as claimed in claim 43, a current regulator in circuit with the solenoids, said regulator having a carbon pile, a solenoid winding in series with the pile, means actuated by said solenoid to vary the pressure on the pile, and a talking circuit subject to variable current.

46. In a telephone service, the combination of a ballast resistor having a solenoid winding located within an external shroud, a central hub of the shroud extending partly through the center of the solenoid, an insulated cap on the shroud, a carbon pile supported by the cap and extending into the center of the solenoid, a core surrounding the pile, means extending through the hub to exert a pressure on the core and hence on the pile, electric connections to the carbon pile and to the solenoid, the solenoid being in series with the pile, a time indicator having a pair of solenoids in circuit with the ballast resistor, the ballast resistor being in series with the solenoids of the time indicator, and a talking circuit subject to a variable current, part of said talking circuit being in circuit with the ballast resistor and the solenoids of the time indicator.

47. In a telephone service as claimed in claim 43, the secondary frame being adjustably mounted on the carrier frame to vary the center of gravity of the carrier frame in relation to the point of pivotal mounting.

48. In a telephone service, the combination of a speech transmitter circuit having a transmitter, means to supply operating current through the transmitter, an electrically operated timing meter with a circuit in parallel with the transmitting circuit, and a current regulator in series with the meter circuit and thus parallel to the transmitting circuit to transmit substantially constant current of varying voltage to the timing meter.

49. In a telephone service as claimed in claim 48, the timing meter having an oscillating closed tube with a liquid conductor in the lower portion and a gas in the upper portion, a pair of resistors attached to the tube, a solenoid having an armature connected to oscillate the tube, and a circuit passing through the liquid container, the resistor and the solenoids.

50. In a telephone service as claimed in claim 48, the current regulator having a solenoid winding with an external and partly internal shroud of high magnetic permeability and rigidly supported carbon pile, a conducting armature encasing the pile and partly housed in the interior of the solenoid winding to vary the pressure on the pile in accordance with the current in the solenoid, the pile and the solenoid being in series.

FRANK S. RICH.